(12) United States Patent
Rachel (10) Patent No.: US 11,503,797 B2
(45) Date of Patent: Nov. 22, 2022

(54) PORTABLE PET RELIEF STATION

(71) Applicant: Cari Rachel, Los Angeles, CA (US)

(72) Inventor: Cari Rachel, Los Angeles, CA (US)

( * ) Notice: Subject to any disclaimer, the term of this patent is extended or adjusted under 35 U.S.C. 154(b) by 92 days.

(21) Appl. No.: 17/116,458

(22) Filed: Dec. 9, 2020

(65) Prior Publication Data

US 2021/0169036 A1 Jun. 10, 2021

Related U.S. Application Data

(60) Provisional application No. 62/946,301, filed on Dec. 10, 2019.

(51) Int. Cl.
| | | |
|---|---|---|
| *A01K 1/01* | (2006.01) | |
| *A01K 1/015* | (2006.01) | |
| *A01K 29/00* | (2006.01) | |
| *G08B 5/36* | (2006.01) | |
| *G08B 3/00* | (2006.01) | |

(52) U.S. Cl.
CPC .......... *A01K 1/0125* (2013.01); *A01K 1/0157* (2013.01); *A01K 29/005* (2013.01); *G08B 3/00* (2013.01); *G08B 5/36* (2013.01)

(58) Field of Classification Search
CPC .... A01K 1/0107; A01K 1/0125; A01K 1/011; A01K 1/0114; A01K 1/015; A01K 1/033
USPC ........ 119/165, 169, 168, 161, 166, 171, 469
See application file for complete search history.

(56) References Cited

U.S. PATENT DOCUMENTS

| | | | |
|---|---|---|---|
| 3,752,121 A | 8/1973 | Brazzell | |
| 3,827,401 A * | 8/1974 | Franzl | A01K 1/0107 119/169 |
| D307,201 S * | 4/1990 | Gold | D30/161 |
| 4,986,218 A * | 1/1991 | Cassone | A01K 1/0107 119/169 |
| 5,134,974 A * | 8/1992 | Houser | A01K 1/0125 119/168 |
| 6,079,363 A * | 6/2000 | MacLaine | A01K 1/0107 119/161 |
| 6,129,050 A * | 10/2000 | Carbajal | A01K 1/0107 119/165 |
| 6,336,497 B1 | 1/2002 | Lin | |
| 7,243,612 B2 | 7/2007 | Costa | |
| 7,434,539 B2 | 10/2008 | Gloor | |
| 8,113,146 B2 * | 2/2012 | Askinasi | A01K 1/0107 119/169 |
| 8,127,717 B1 * | 3/2012 | Trodella | A01K 1/0107 119/161 |
| 8,336,497 B2 * | 12/2012 | van Zuilekom | A01K 1/0107 119/168 |
| 8,505,486 B2 * | 8/2013 | Trussardi | A01K 1/0107 119/169 |
| 8,522,719 B2 * | 9/2013 | Feld | A01G 9/033 119/168 |

(Continued)

FOREIGN PATENT DOCUMENTS

KR 101935864 B1 1/2019

*Primary Examiner* — Yvonne R Abbott-Lewis (74) *Attorney, Agent, or Firm* — Concept IP LLP; Pejman Yedidsion (57) ABSTRACT

Systems, devices, and methods including a base; one or more perimeter walls attached to the base; a grass mat, where the grass matt is contained within the tray by the one or more perimeter walls; and one or more removable splash guard walls, where the one or more removable splash guard walls are connected to the one or more perimeter walls.

18 Claims, 10 Drawing Sheets

(56) References Cited

U.S. PATENT DOCUMENTS

| | | | |
|---|---|---|---|
| 8,656,863 B2 * | 2/2014 | Havluciyan | A01K 1/0107 |
| | | | 119/165 |
| 8,863,693 B2 * | 10/2014 | Kennington | A01K 1/011 |
| | | | 119/161 |
| 9,198,397 B2 * | 12/2015 | Gouy | A01K 1/011 |
| 9,750,224 B2 | 9/2017 | Kupka | |
| 11,032,997 B2 * | 6/2021 | Martin | A01K 1/0107 |
| 11,089,759 B2 * | 8/2021 | Fogle | B25G 1/04 |
| 11,224,197 B1 * | 1/2022 | Williams | E04H 15/003 |
| 2008/0251026 A1 * | 10/2008 | Bell | A01K 1/0125 |
| | | | 119/168 |
| 2010/0122662 A1 | 5/2010 | Kennington | |
| 2012/0137981 A1 * | 6/2012 | Weissberg | A01K 1/0107 |
| | | | 119/166 |
| 2012/0234253 A1 | 9/2012 | Malm et al. | |
| 2012/0312242 A1 * | 12/2012 | Hillman | A01K 1/0125 |
| | | | 119/169 |
| 2013/0298840 A1 | 11/2013 | Mishan | |

* cited by examiner

PORTABLE PET RELIEF STATION

CROSS-REFERENCE TO RELATED APPLICATIONS

This application claims priority to and the benefit of U.S. Provisional Patent Application No. 62/946,301, filed Dec. 10, 2019, the contents of which are hereby incorporated by reference herein for all purposes.

TECHNICAL FIELD

Embodiments relate generally to pet stations, and more particularly to pet relief stations.

BACKGROUND

Pets require access to a place to relieve themselves to avoid accidents. Artificial turf may be used as a base to collect pet waste. Artificial turf may often retain odors thereby creating an unpleasant experience for humans. Flat trays containing artificial turf do not have a way to avoid pet waste from extending beyond the confines of the tray.

SUMMARY

A system embodiment may include: a base; one or more perimeter walls attached to the base, where the one or more perimeter walls and the base form a tray;

and one or more removable splash guard walls, where the one or more removable splash guard walls may be connected to the one or more perimeter walls, and where a liquid applied to a portion of the one or more removable splash guard walls may be configured to flow down the one or more removable splash guard wall and the one or more perimeter walls and into the tray.

Additional system embodiments may include: a grass mat, where the grass mat may be contained within the base by the one or more perimeter walls. Additional system embodiments may include: a sprayer, where the sprayer may be configured to maintain moisture in the grass mat. Additional system embodiments may include: a proximity sensor configured to detect use of the system by a pet. In additional system embodiments, the proximity sensor may be in communication with the sprayer, and the sprayer may be configured to dispense a liquid onto the grass mat after a set duration from when use of the system by the pet was detected by the proximity sensor. Additional system embodiments may include: a speaker in communication with the proximity sensor, where the speaker may be configured to play one or more pre-recorded sounds based on detected use of the system by the proximity sensor in order to encourage use of the system by the pet. Additional system embodiments may include: a light emitting diode (LED) in communication with the proximity sensor, where the LED may be configured to illuminate based on detected use of the system by the proximity sensor in order to alert a user that the pet has used the system and clean-up may be required.

In additional system embodiments, the grass mat comprises two or more sections. In additional system embodiments, the one or more perimeter walls comprise a curved section sloping down to the base, where the curved section provides for easier cleaning and directs urine on the one or more removable splash guard walls toward a middle of the tray and away from edges of the tray.

In additional system embodiments, the one or more removable splash guard walls may be adjustable in height based on at least one of: wind speeds, weather conditions, pet size, and pet gender. In additional system embodiments, the one or more removable splash guard walls comprise two or more segments to adjust a height of each of the one or more removable splash guard walls. In additional system embodiments, the two or more segments are foldable.

Additional system embodiments may include: a fire hydrant disposed within the tray, where the fire hydrant provides an attractant to a pet. Additional system embodiments may include: a design configured to affix to at least a portion of the one or more removable splash guard walls, where the design helps conceal the appearance of dust, dirt, or urine on the one or more removable splash guard walls.

A method embodiment may include: attaching one or more removable splash guard walls to one or more perimeter walls attached to a base, where the one or more perimeter walls and the base form a tray; placing a first grass mat within the tray; applying water to the first grass mat to prolong use of the first grass mat; removing the first grass mat from the tray; and placing a second grass mat within the tray.

In additional method embodiments, the first grass mat comprises two or more sections, and where the method further comprises: rotating the two or more sections of the grass mat within the tray to prolong use of the grass mat based on the received sunlight of each section of the two or more sections of the grass mat. Additional method embodiments include: removing the second grass mat from a green trash bag;

placing the removed first grass mat in the green trash bag; and disposing of the green trash bag.

A device embodiment may include: a base; one or more perimeter walls attached to the base, where the one or more perimeter walls and the base form a tray;

and one or more removable splash guard walls, where the one or more removable splash guard walls may be connected to the one or more perimeter walls, and where a liquid applied to a portion of the one or more removable splash guard walls may be configured to flow down the one or more removable splash guard wall and the one or more perimeter walls and into the tray.

In additional device embodiments, the one or more perimeter walls comprise a curved section sloping down to the base, where the curved section provides for easier cleaning and directs urine on the one or more removable splash guard walls toward a middle of the tray and away from edges of the tray. In additional device embodiments, the one or more removable splash guard walls may be adjustable in height.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1A:
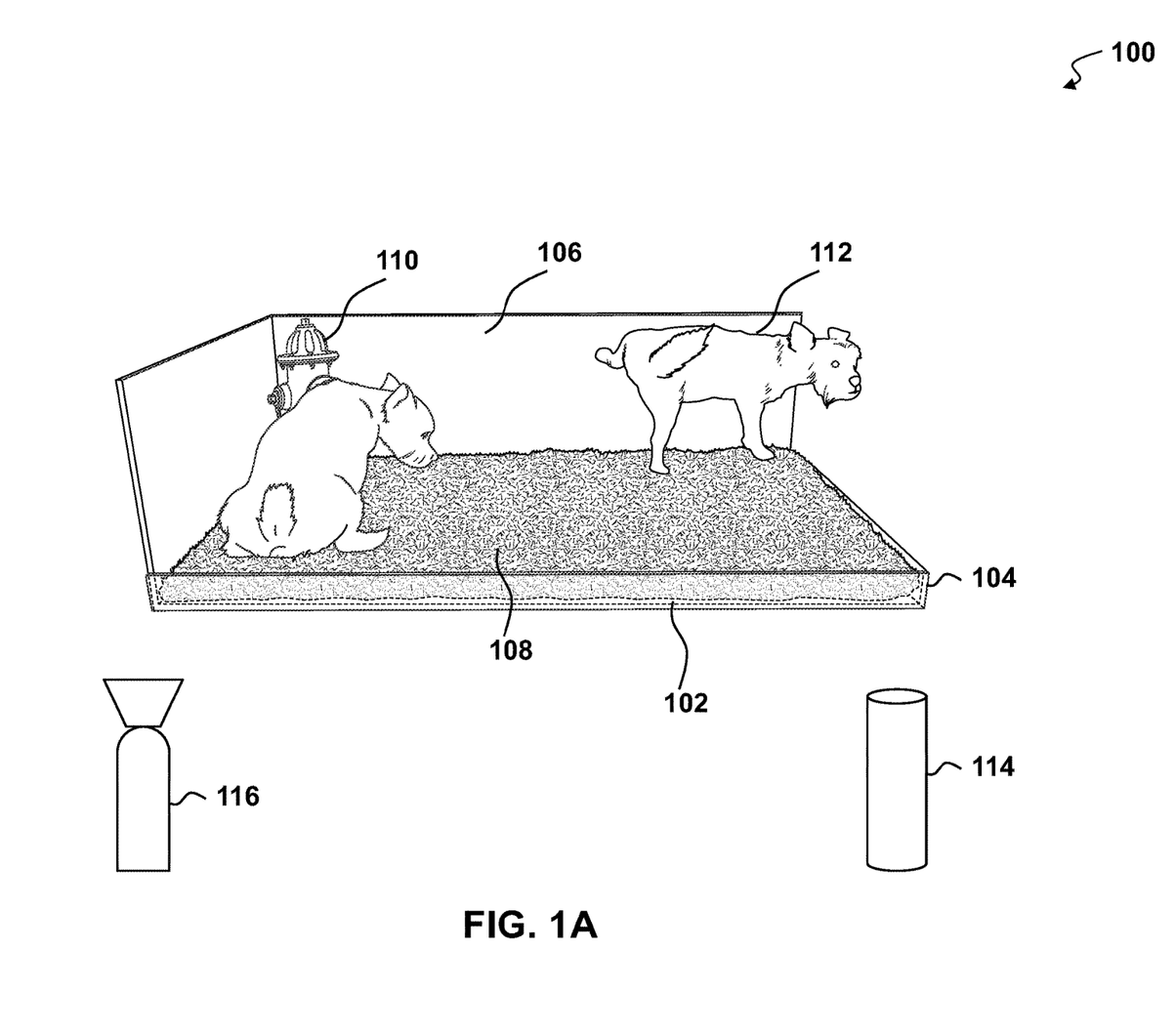
FIG. 1A depicts a portable pet station in use.

With respect to FIG. 1A, a portable pet station 100 for use by dogs, cats, and other pets that are owned as house pets, for urination and defecation is shown. The portable pet station 100 includes a base 102, perimeter walls 104, removable splash guard walls 106, and a grass mat 108. The one or more perimeter walls 104 may be attached to the base 102. The grass mat 108 may be contained within the tray by the one or more perimeter walls 104. The one or more removable splash guard walls 106 may be connected to the one or more perimeter walls 104.

In one embodiment, the grass mat 108 is artificial grass. In another embodiment, the grass mat 108 is live grass. The grass mat 108 may be contained within a tray by the perimeter walls 104. The grass mat 108 may provide a natural environment for the pet to urinate or defecate. In one embodiment, the outdoor pet station includes an ornamental fire hydrant 110. In one embodiment, the ornamental fire hydrant 110 may be connected to the base 102. In other embodiments, the ornamental fire hydrant 110 may be placed on top of the grass mat 108. The ornamental fire hydrant 110 may provide an additional attractant for the pet, and can be an accessory of various designs including, but not limited to a fire hydrant, a small tree, or the like. In one embodiment, the ornamental fire hydrant 110 is constructed of a polypropylene material.

The portable pet station 100 may be used inside or outside. Using the portable pet station 100 outside may help prevent waste from entering a home. Additionally, in an outdoor setting, odors may naturally dissipate. Furthermore, it is generally desired to have a pet urinate/defecate outside as opposed to the pet thinking it is allowed to urinate/defecate inside.

The portable pet station 100 may require very low levels of maintenance. For example, the liquid relieved on the live grass of the grass mat 108 may be absorbed in the live grass, and solid waste may be removed with a bag. The grass mat 108 may be easily removed and replaced, and the grass mat 108 provides a comfortable, natural environment for pet relief purposes.

This portable pet station 100 may also entrap urine when released by a male dog 112 with one or more splash guard walls 108. In some embodiments, the one or more splash guard walls 108 may offer protection from inclement weather, such as wind, rain, snow, or the like, when the portable pet station 100 is being utilized outdoors.

In order to maximize the lifetime of the live grass mat 108, a new grass mat 108 may be delivered to maintain freshness. In on embodiment, the pet defecation may be removed with the use of a bag, similar to how one would pick up after a dog when walking the dog. The grass mat 108 may not need any further maintenance until a new grass mat is delivered to the owner. In one embodiment, the grass mat 108 maybe sprayed with water (e.g., with a water bottle 116) to maintain moisture of the grass mat 108. When the portable pet station 100 is in an outdoor setting, any odor may be mitigated or eliminated.

In one embodiment, the grass mat 108 may be delivered to the pet owner. In one embodiment, the grass mat 108 is delivered weekly. In one embodiment, the grass mat 108 may be rolled in plastic and placed in a box and arrive to the pet owner with gloves. In one embodiment, the gloves are thin, plastic, disposable gloves to handle live grass neatly. When the grass mat 108 arrives, the pet owner may roll up the old grass mat 108 and place the old grass mat 108 in a trash bag 114. In one embodiment, the grass mat 108 is a 'green' trash bag to be placed in a green, pet-specific waste receptacle. In another embodiment, the old grass mat 108 in the trash bag may be placed in a trash receptacle.

In another embodiment, the packaging used for the delivery of the new grass mat 108 may be used for the disposal for the old grass mat 108. Therefore, the pet owner receives the replacement grass mat 108 in a bag along with the gloves. The pet owner may remove the new grass mat and gloves, and use the gloves to hygienically transfer and dispose of the old grass mat in the bag that the new grass mat arrived in.

Upon removal/disposal of the old grass mat 108, the new grass mat 108 may be placed into the tray. In one embodiment, the grass mat 108 absorbs odors and liquid waste, thereby eliminating/mitigating spillage from the pet station 100. Additionally, due to the absorbent quality of the live grass of the grass mat 108, the base 102 seldom requires cleaning. In one embodiment, the perimeter walls 104 and the removable splash guard walls 106 may be sprayed with a water bottle 116 (e.g., a water bottle with water and/or pet-friendly cleanser) and wiped with a paper towel or cloth for cleaning. Spraying the walls 104 of the pet station 100 may remove any marks from dirt, dust, and/or urine.

In some embodiments, the one or more removable splash guard walls 106 may be adjusted in height. In other embodiments, the one or more removable splash guard walls 106 may be selected based on a desired height. For example, an owner of a large dog breed may select higher splash guard walls 106 while an owner of a smaller dog breed may select lower splash guard walls 106. The height of the splash guard walls 106 may also be selected and/or adjusted based on the placement and location of the portable pet station 100. For example, placement in an area with high winds or inclement weather may require higher splash guard walls 106 to protect against inclement weather.

In some embodiments, the grass mat 108 may be a single piece that may be rolled up for transport and disposal. In other embodiments, the grass mat 108 may be divided into several pieces for easier removal. In some embodiments, portions of the grass mat 108 may be replaced rather than the entire grass mat 108. For example, one section of the grass mat 108 may need to be replaced and can be removed while leaving other portions. A delivery service may send a single section of the grass mat 108 at regular intervals and the user may replace each section based on need. So, a section that is often used by the pet to urinate or defecate or that is in a shaded area may be replaced more often than a section that is not used as often or is in an area that receives more Sun. The grass mat 108 is more effective for absorbing odors and minimizing odors than a plastic or fake grass mat. Most relief stations utilize plastic grass. Plastic grass is a housing for urine, urine calcification and leftover solid waste that attaches to plastic. The disclosed pet station 100 is meant to be used with real grass. Real grass absorbs odor and liquid, in addition, solid waste typically does not adhere to the grass the way it would with plastic, and once removed, grass is 'fresh' again. As grass would remain in tray for 1 to 2 weeks and then get disposed, the tray remains fresh and clean. The soil at base of grass acts as a sponge and absorbs any urine seepage.

In some embodiments, the base 102, one or more perimeter walls 104, and/or removable splash guard walls 106 may be made from a seamless plastic to be easier to clean. In some embodiments, the base 102, one or more perimeter walls 104, and/or removable splash guard walls 106 may include curved edges to prevent stains from collecting in corners. In some embodiments, one or more designs may be inserted into, or behind, the removable splash guard walls 106. The designs may create the appearance of a backdrop and/or reduce the visual impact of any stains.

Figure 1B:
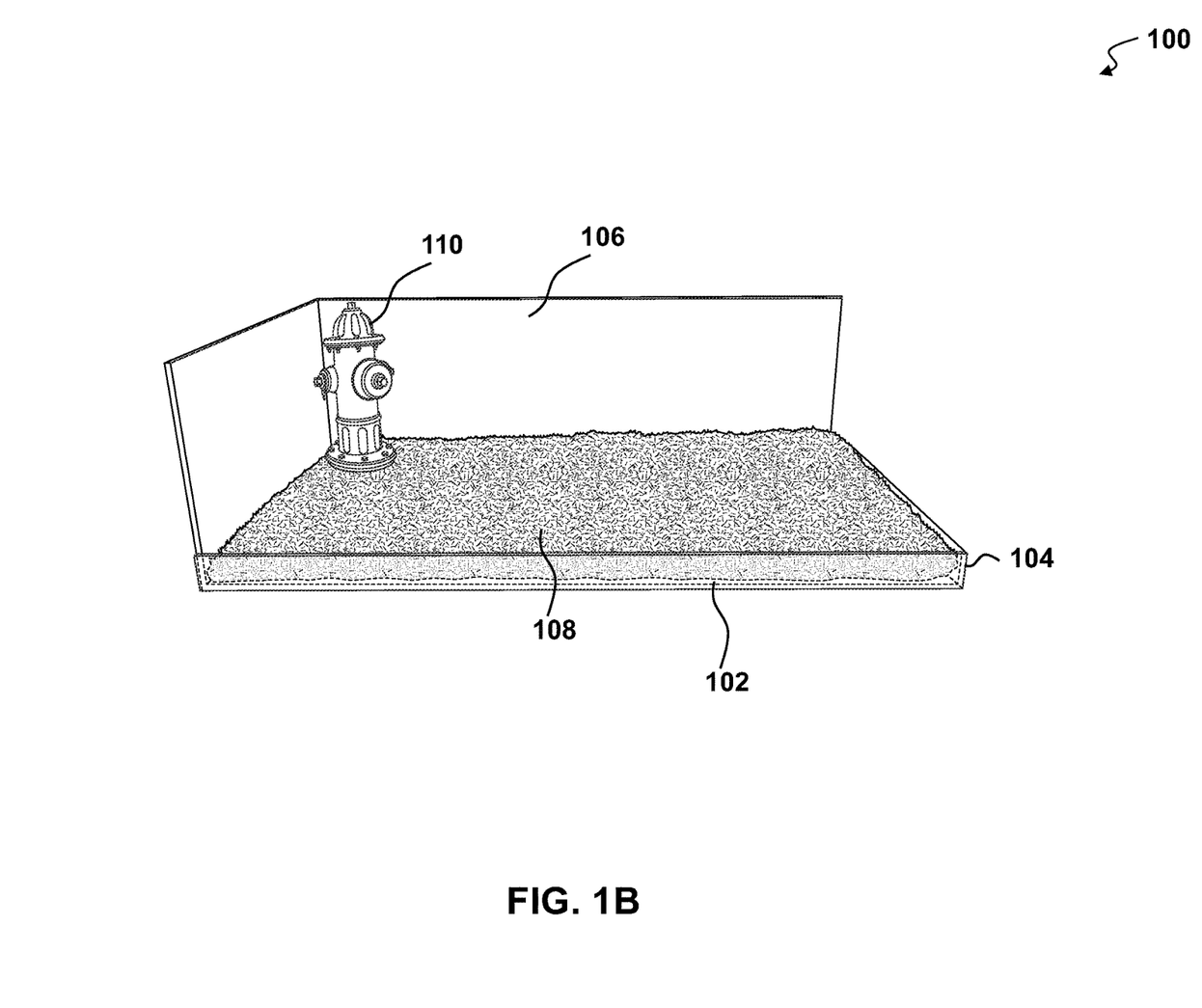
FIG. 1B depicts the portable pet station of FIG. 1A with guard walls and a grass mat.

FIG. 1B depicts the portable pet station 100 of FIG. 1A with guard walls 106 and a grass mat 108. In one embodiment, the outdoor pet station includes an ornamental fire hydrant 110. The ornamental fire hydrant 110 may provide an additional attractant for the pet, and can be an accessory of various designs including, but not limited to a fire hydrant, a small tree, or the like. The grass mat 108 may be contained within a tray by the perimeter walls 104. The perimeter walls 104 and/or guard walls 106 may surround the base 102.

Figure 1C:
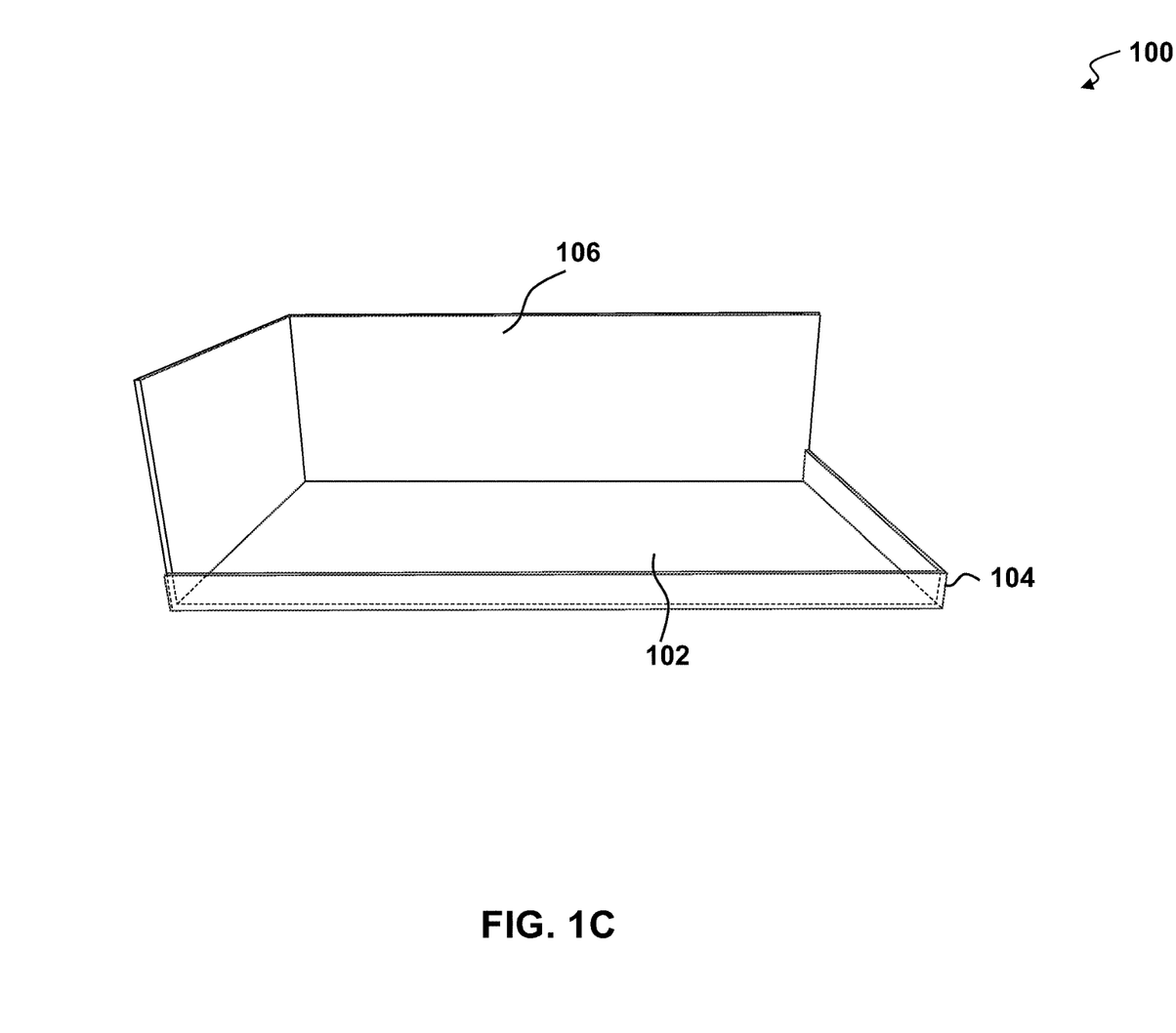
FIG. 1C depicts the portable pet station of FIG. 1A with the grass mat removed.

FIG. 1C depicts the portable pet station 100 of FIG. 1A with the grass mat removed. The pet station 100 may include perimeter walls 104 and/or guard walls 106 that surround the base 102.

Figure 2:
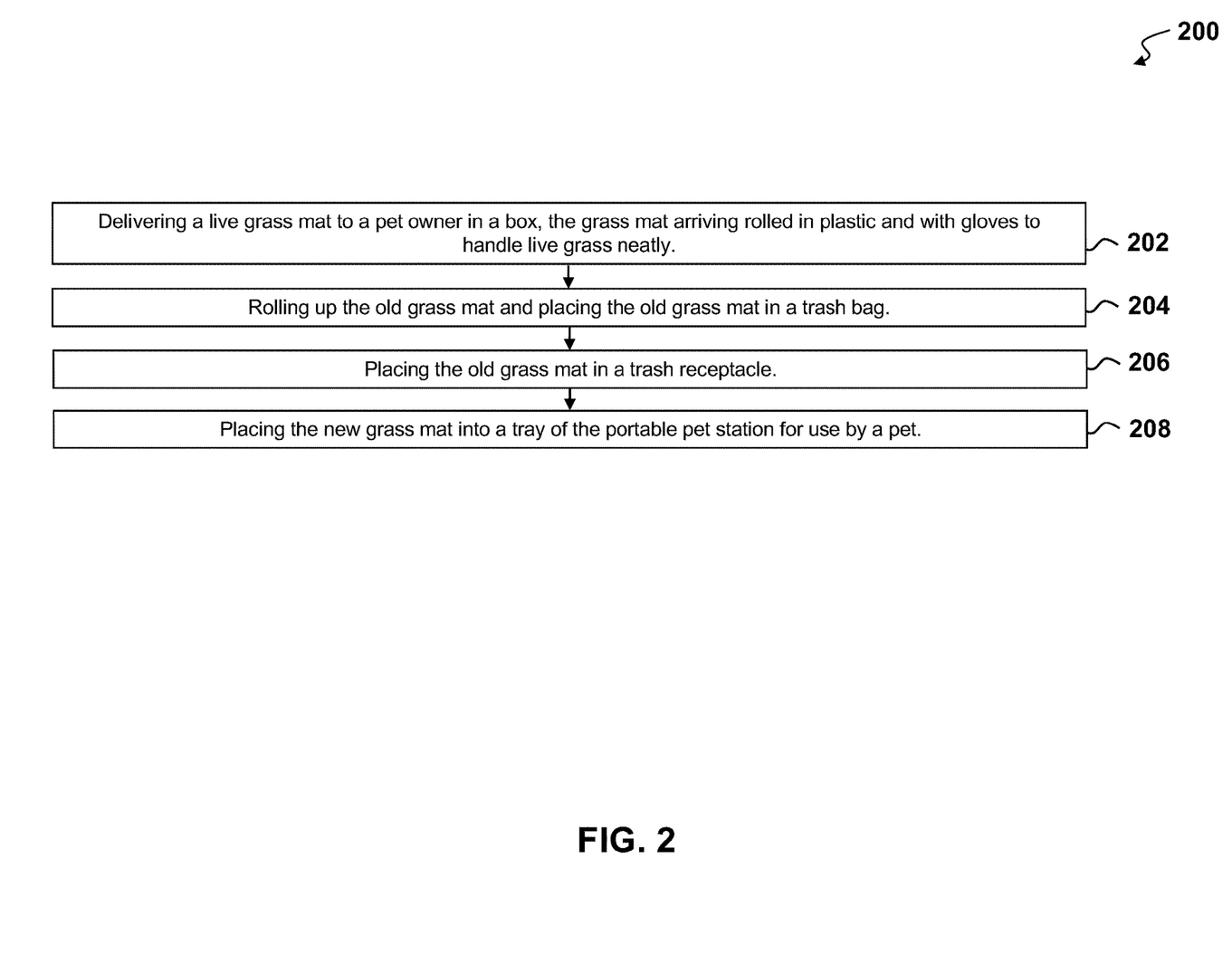
FIG. 2 depicts a process for removal and replacement of a live grass mat of a portable pet station.

With respect to FIG. 2, a process 200 for removal and replacement of a live grass mat of a portable pet station is illustrated. At step 202, a live grass mat may be delivered to a pet owner in a box. The grass mat arrives rolled in plastic and with gloves to handle live grass neatly. When the grass mat arrives, the pet owner may roll up the old grass mat and place the old grass mat in a trash bag, at step 204. At step 206, the old grass mat is placed in a trash receptacle. In one embodiment, the grass mat is a 'green' trash bag to be placed in a green, pet-specific waste receptacle. At step 208, the new grass mat may be placed into a tray of the portable pet station for use by a pet.

Figure 3:
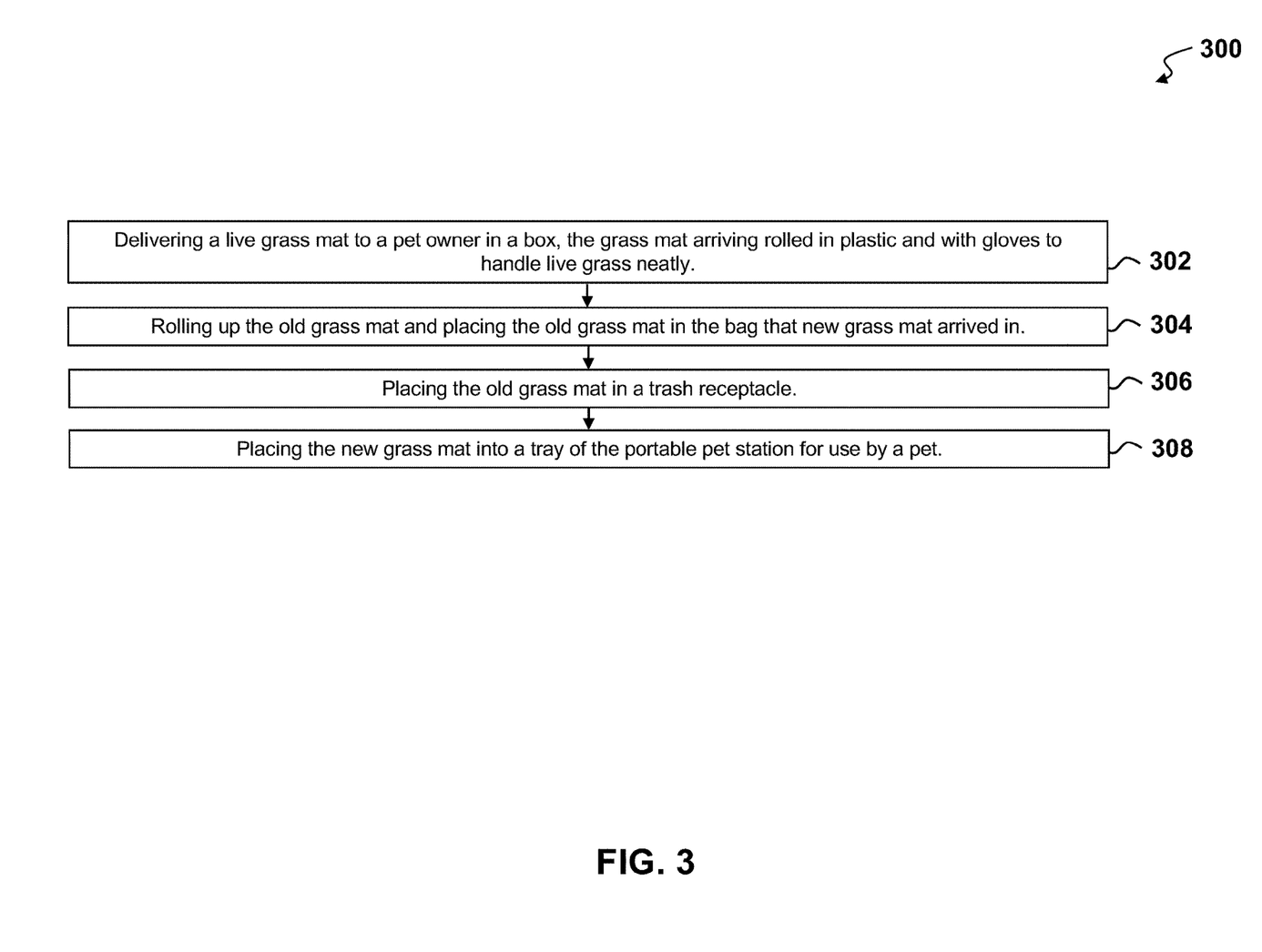
FIG. 3 depicts an alternative process for removal and replacement of a live grass mat of a portable pet station.

With respect to FIG. 3, a process 300 for removal and replacement of a live grass mat of a portable pet station is illustrated. At step 302, a live grass mat may be delivered to the pet owner in a box. The grass mat may arrive in a bag and with gloves to handle live grass neatly. When the grass mat arrives, the pet owner may roll up the old grass mat and place the old grass mat in the bag that the new grass mat arrives in, at step 304. At step 306, the old grass mat is placed in a trash receptacle. In one embodiment, the grass mat is a 'green' trash bag to be placed in a green, pet-specific waste receptacle. At step 308, the new grass mat may be placed into a tray of the portable pet station for use by a pet.

Figure 4A:
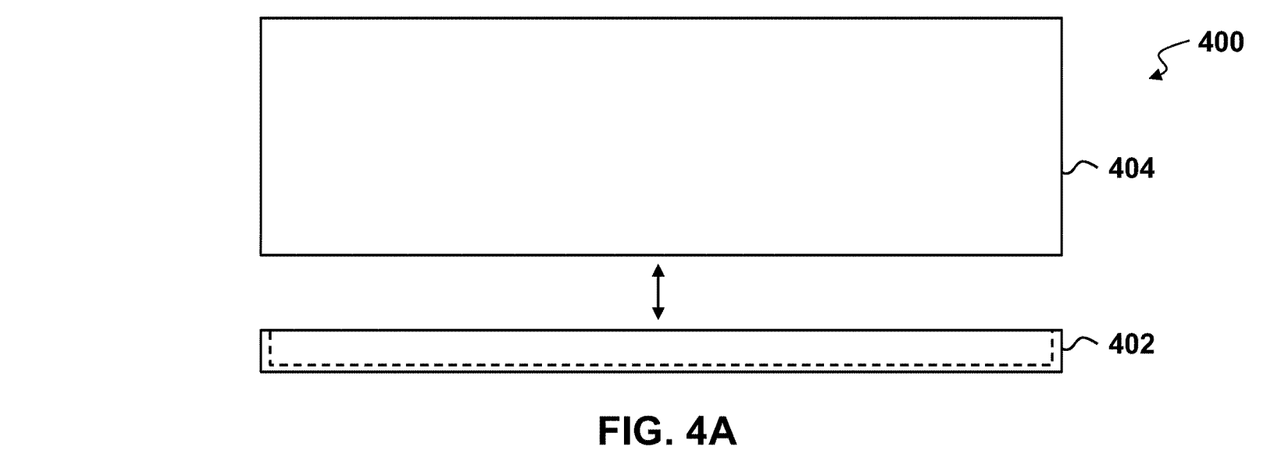
FIG. 4A depicts a front view of a portable pet station having removable guard walls.

FIG. 4A depicts a front view of a portable pet station 400 having removable guard walls. A base 402 of the portable pet station 400 may have one or more walls to contain a replaceable grass mat stored within the base 402. A removable guard wall 404 may be attached to the base 402 to extend a height of the one or more walls of the base 402. The removeable guard wall 404 may be used to direct pet urination into the base 402, protect the portable pet station 400 from wind, and/or obscure a portion of the portable pet station 400 from view.

Figure 4B:
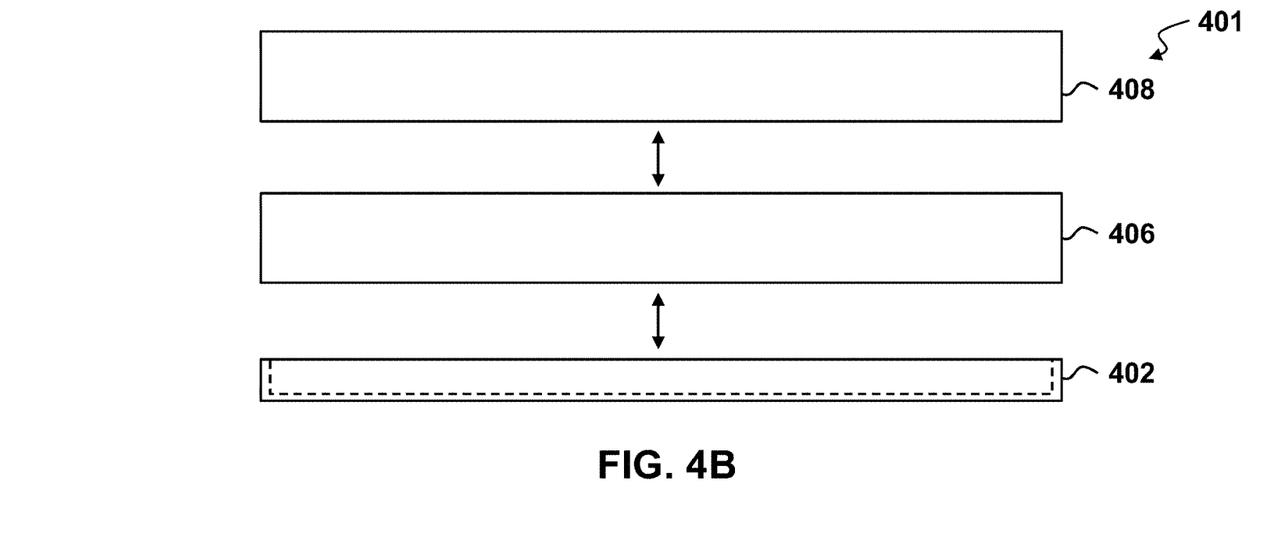
FIG. 4B depicts a front view of a portable pet station having guard walls with an adjustable height.

FIG. 4B depicts a front view of a portable pet station 401 having guard walls with an adjustable height. The base 402 of the portable pet station 401 may receive one or more guard walls 406, 408 having an adjustable height. In one embodiment, a first segment 406 of a guard wall may be secured to the base 402 of the portable pet station 401. In another embodiment, a second segment 408 of a guard wall may be secured to the first segment 406 of the guard wall to increase a height of the guard wall. Utilizing multiple sections 406, 408 of the guard wall allows the user to customize the portable pet station 401 to a desired height based on a size of the pet using the portable pet station 401, a desired wind protection, and a desired visual blocking of the portable pet station 401. By way of example, a large dog or a male dog may require the use of a higher guard wall than a smaller dog or a female dog. While two segments 406, 408 of the guard wall are shown, any number of segments may be used to create a desired guard wall height.

In some embodiments, the guard walls 406, 408 may be removable from the base 402 of the portable pet station 401 for shipping. In other embodiments, the guard walls 406, 408 may be removable from the base 402 of the portable pet station for cleaning the guard walls 406, 408. In some embodiments, the guard walls 406, 408 may be foldable so as to collapse down to a smaller size for shipping and/or storage of the portable pet station 401.

Figure 5:
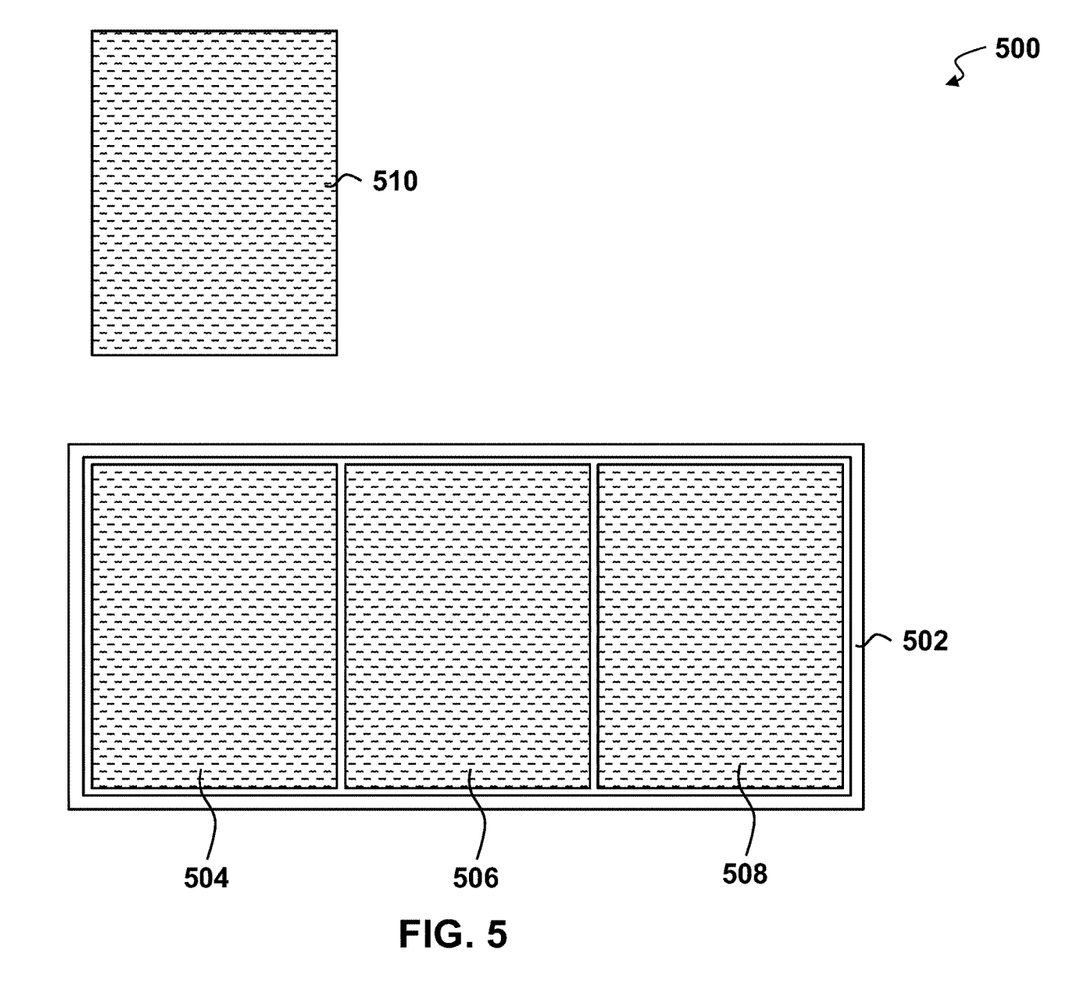
FIG. 5 depicts a top view of a portable pet station having one or more grass mats.

FIG. 5 depicts a top view of a portable pet station 500 having one or more grass mats. In some embodiments, the portable pet station may have a single grass mat, such as shown in FIGS. 1A-1B. In other embodiments, the portable pet station 500 may have two or more smaller grass mats 504, 506, 508 to fill the base 502 of the portable pet station 500. The smaller grass mats 504, 506, 508 may allow a user to replace one of the smaller grass mats 504, 506, 508 with a replacement grass mat 510. The smaller grass mats 504, 506, 508 may also allow a user to rotate or rearrange each of the smaller grass mats 504, 506, 508 as needed. By way of example, the portable pet station 500 may be placed on a balcony of a pet owners home. In this location, an outer grass mat 508 may receive more sunlight than the other grass mats 504, 506, which may cause the outer grass mat 508 to dry out before the other grass mats 504, 506. Instead of replacing an entire grass mat when a section dries out, the user may take two actions. First, the user may replace the outer grass mat 508 with a replacement grass mat section 510. Second, the user may rotate the grass mat sections 504, 506, 508, such as by swapping the location of inner grass mat 504 and outer grass mat 508. Alternatively, the user may move middle grass mat 506 to the location of outer grass mat 508; move inner grass mat 504 to the location of middle grass mat 506; and move outer grass mat 508 to the location of inner grass mat 504. Other arrangements and rotations are possible and contemplated.

In some embodiments, the user may subscribe to purchase a replacement grass mat section 510 at regular intervals. The user may then replace a grass mat section 504, 506, 508 needing replacement instead of replacing all of the grass mat sections 504, 506, 508 at once. By only replacing a section at a time, the user may exert less work. Each smaller section may be easier for the user to handle than one single larger section.

Figure 6:
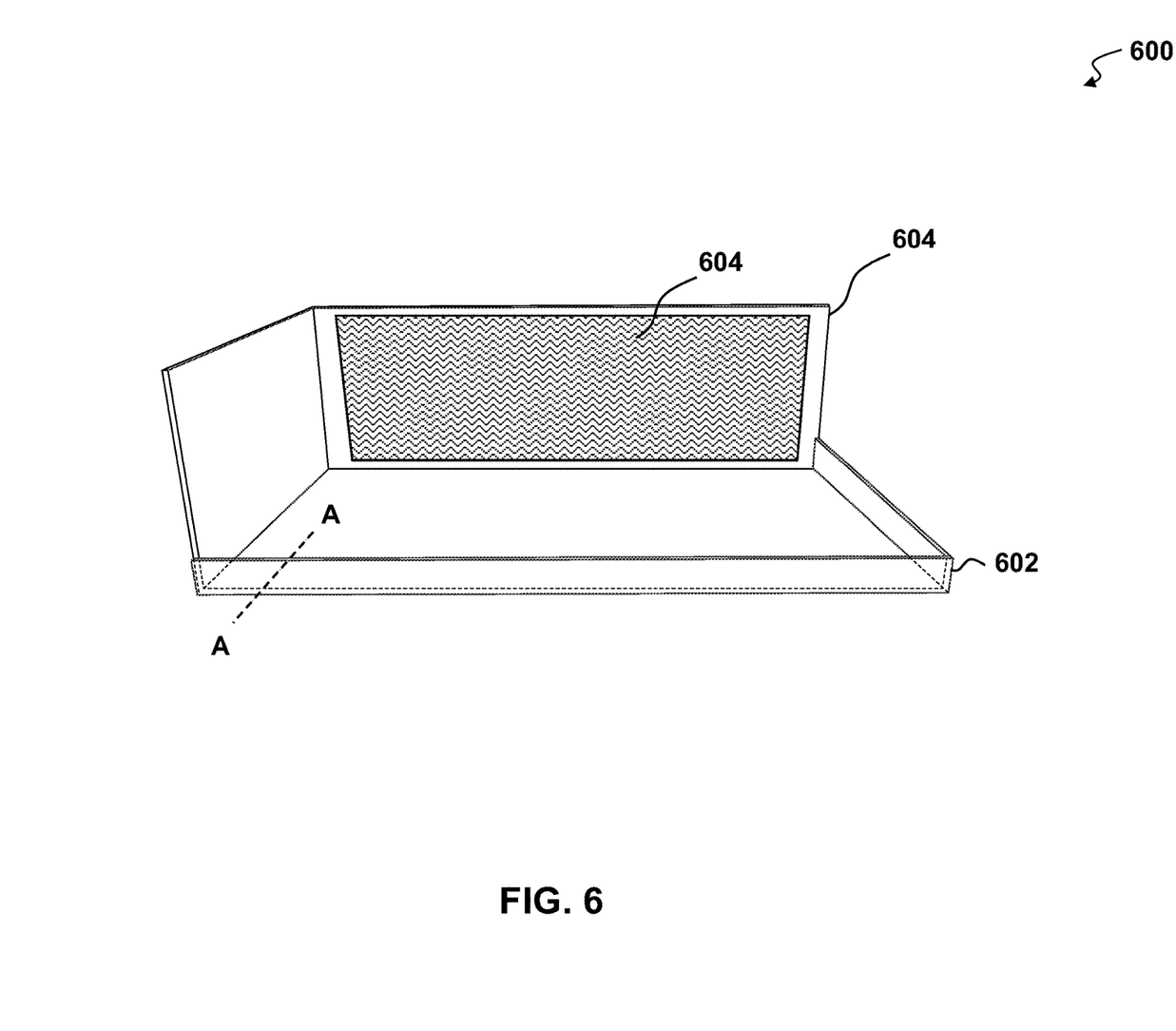
FIG. 6 depicts a perspective view of a portable pet station having a design on a guard wall.

FIG. 6 depicts a perspective view of a portable pet station 600 having a design 604 on a guard wall 604. One or more guard walls 604 of the portable pet station 600 may contain a design 604. The design 604 may be an image, a color, a texture, or the like. The design 604 may help to conceal the appearance of dust, dirt, urine, or the like on the guard walls 604 to present a cleaner appearance to a user. In some embodiments, the design 604 may be affixed to an inner surface of the guard wall 604, where the inner surface is proximate the base 602 of the portable pet station 600. In other embodiments, the design may be affixed to an outer surface of the guard wall 604, where the outer surface is opposite the inner surface. The outer surface is not likely to be urinated on by a pet and so maintains a cleaner appearance. In some embodiments, the design may be inserted into a portion of the guard wall 604 between the inner wall and the outer wall. The design 604 may cover a portion of at least one guard wall 604 in one embodiment. In other embodiments, the design 604 may cover the entire guard wall 604 to create a seamless appearance.

Figure 7:
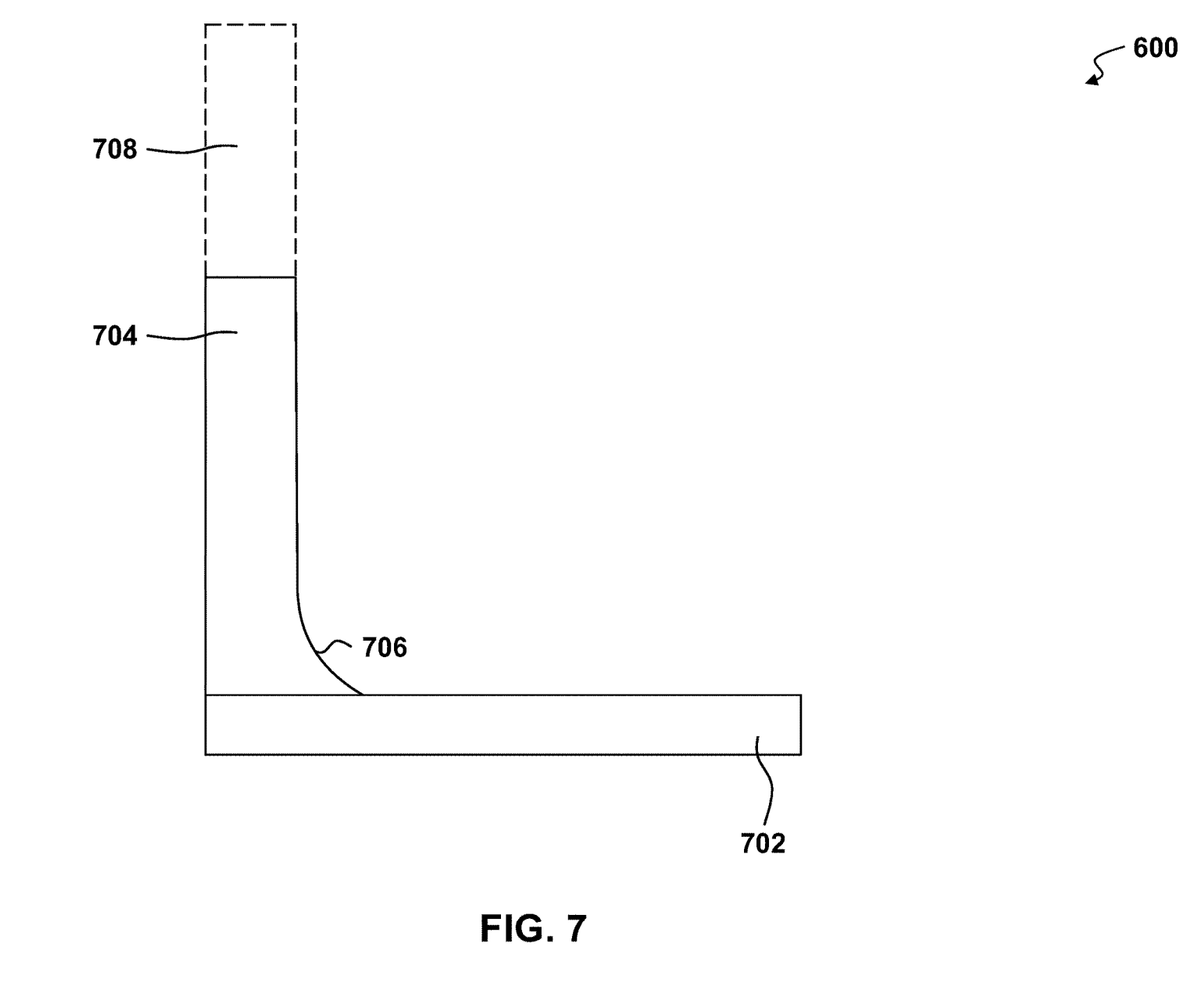
FIG. 7 depicts a close-up cross-sectional view of a curved perimeter wall of a portable pet station across line A-A of FIG. 6.

FIG. 7 depicts a close-up cross-sectional view of a curved perimeter wall 704 of a portable pet station 600 across line A-A of FIG. 6. The base 702 of the portable pet station 700 may have one or more perimeter walls 704, such as four walls, to create an area to receive a grass mat. In some embodiments, one or more perimeter walls 704 may include a curved section 706 sloping down to the base 702. The curved section 706 may provide for easier cleaning of the portable pet station 600 as it avoids the use of crevices to trap urine, dust, dirt, or the like. In some embodiments, a guard wall 708 may be attached to the one or more perimeter walls 704. Urine on the guard wall 708 may flow down along the guard wall and perimeter wall 704 to the curved section 706. The curved section 706 may allow the urine to flow towards a middle of the base 702 and away from the edges of the base 702. This flow may avoid the pooling of urine at the edges where absorption by the grass pad may be limited. By distributing the urine across the grass pad, more urine may be absorbed before the grass pad needs to be replaced and odors may be greatly reduced.

Figure 8:
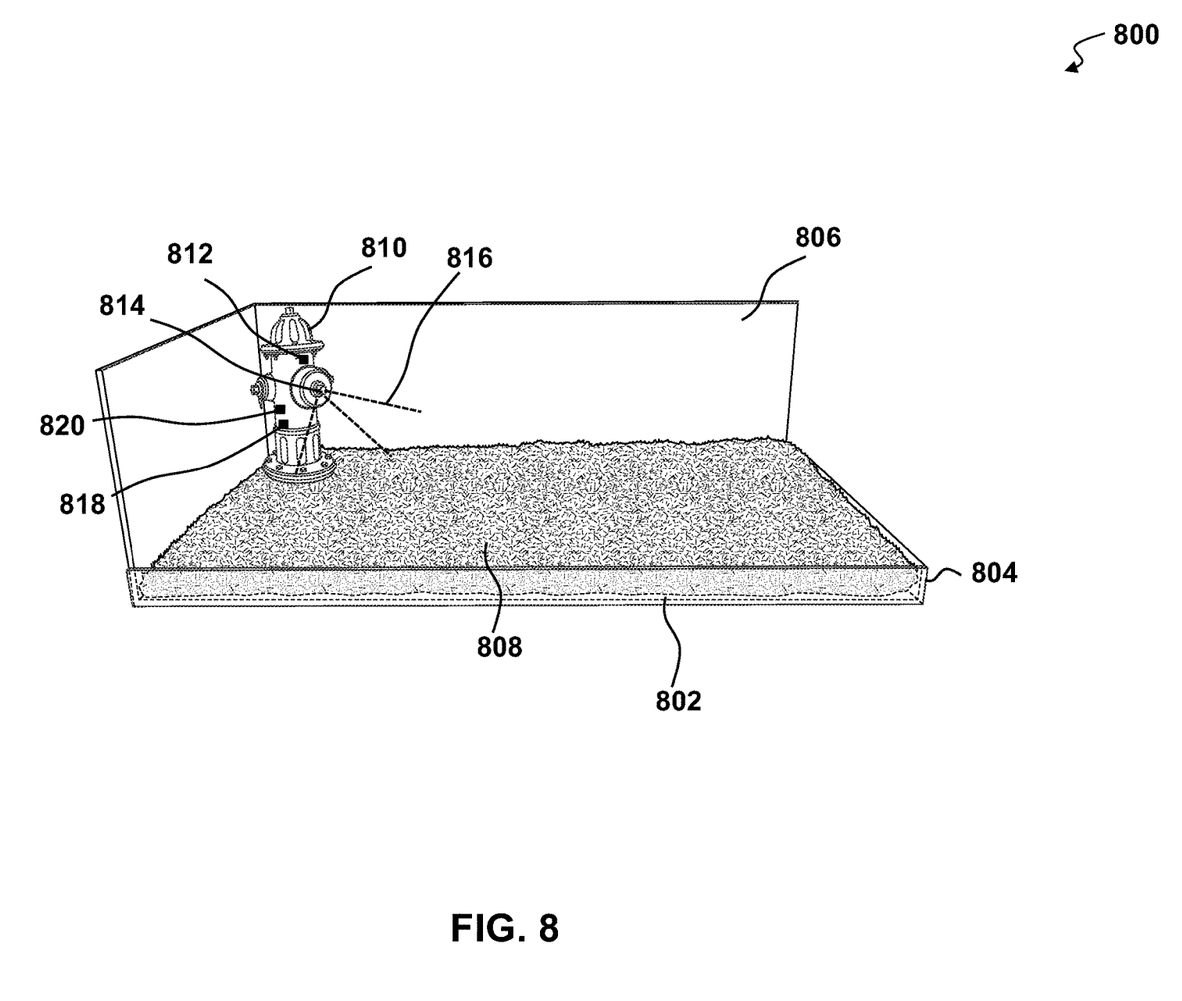
FIG. 8 depicts a perspective view of a portable pet station having a sprayer to keep the grass mat moistened.

FIG. 8 depicts a perspective view of a portable pet station 800 having a sprayer to keep the grass mat moistened. In some embodiments, a device 810, such as a fire hydrant, a small tree, or the like may be placed on top of the grass mat 808 and/or the base 802. The grass mat 808 may be enclosed by one or more perimeter walls 804 and/or one or more guard walls 806.

In some embodiments, the device 810 may include a sprayer 814 for dispensing a liquid 816 such as water, a cleaning solution, an odor covering solution, or the like. In some embodiments, the sprayer 814 may be manually operated. In other embodiments, the sprayer may be in communication with a sensor 812 such as a proximity sensor, movement sensor, or the like. The sprayer 814 may dispense liquid 816 after the sensor 812 detects use of the portable pet station 800. For example, a pet may urinate on the grass mat. After a set duration, such as two minutes after the pet is detected by the sensor 812 to ensure that the pet has left the grass mat 808, the sprayer 814 may dispense the liquid 816. The liquid 816 may be used to reduce odors from elimination by the pet. In some embodiments, the sprayer 814 may operate at set intervals to reduce odors, ensure that the grass mat 808 remains moistened, or the like.

In some embodiments, the device 810 may include a speaker 818. The speaker 818 may be used to place pre-recorded sounds. In one embodiment, the speaker 818 may play a sound based on the detection of a pet by the sensor 812. For example, the speaker 818 may play a sound of a user when the pet uses the portable pet station 800 to provide positive feedback that encourages the pet to continue using the portable pet station 800, even when the user is not present.

In some embodiments, the device 810 may include a notification 820. In some embodiments, the notification 820 may be a transmitter. The transmitter may send a message to a user device that the pet has used the portable pet station 800. This message may alert the user that excretion from the pet may need to removed, such as via a bag, to avoid odors. In other embodiments, the notification may be a light, such as a light-emitting diode (LED). The illuminated light may alert the user that the portable pet station 800 has been used and that clean-up may be required.

While the device 810 is shown as a fire hydrant, any device shape or size may be used. In one embodiment, the device 810 may be attached to one or more guard walls 806. In another embodiment, the device may be located off of the grass mat 808.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another to form varying modes of the disclosed invention. Further, it is intended that the scope of the present invention is herein disclosed by way of examples and should not be limited by the particular disclosed embodiments described above.

What is claimed is:

1. A system comprising:
a base;
one or more perimeter walls attached to the base, wherein the one or more perimeter walls and the base form a tray; and
one or more removable splash guard walls, wherein the one or more removable splash guard walls are connected to the one or more perimeter walls, wherein a liquid applied to a portion of the one or more removable splash guard walls is configured to flow down the one or more removable splash guard walls and the one or more perimeter walls and into the tray, and wherein the one or more removable splash guard walls comprise two or more segments to adjust a height of each of the one or more removable splash guard walls.

2. The system of claim 1, further comprising:
a grass mat, wherein the grass mat is contained within the base by the one or more perimeter walls.

3. The system of claim 2, further comprising:
a sprayer, wherein the sprayer is configured to maintain moisture in the grass mat.

4. The system of claim 3, further comprising:
a proximity sensor configured to detect use of the system by a pet.

5. The system of claim 4, wherein the proximity sensor is in communication with the sprayer, and wherein the sprayer is configured to dispense a liquid onto the grass mat after a set duration from when use of the system by the pet was detected by the proximity sensor.

6. The system of claim 4, further comprising:
a speaker in communication with the proximity sensor, wherein the speaker is configured to play one or more pre-recorded sounds based on detected use of the system by the proximity sensor in order to encourage use of the system by the pet.

7. The system of claim 4, further comprising:
a light emitting diode (LED) in communication with the proximity sensor, wherein the LED is configured to illuminate based on detected use of the system by the proximity sensor in order to alert a user that the pet has used the system and clean-up may be required.

8. The system of claim 2, wherein the grass mat comprises two or more sections.

9. The system of claim 2, wherein the one or more perimeter walls comprise a curved section sloping down to the base, wherein the curved section provides for easier cleaning and directs urine on the one or more removable splash guard walls toward a middle of the tray and away from edges of the tray.

10. The system of claim 1, wherein the one or more removable splash guard walls are adjustable in height based on at least one of: wind speeds, weather conditions, pet size, and pet gender.

11. The system of claim 1, wherein the two or more segments are foldable.

12. The system of claim 1, further comprising:
a fire hydrant disposed within the tray, wherein the fire hydrant provides an attractant to a pet.

13. The system of claim 1, further comprising:
a design configured to affix to at least a portion of the one or more removable splash guard walls, wherein the design helps conceal the appearance of dust, dirt, or urine on the one or more removable splash guard walls.

14. A method comprising:
attaching one or more removable splash guard walls to one or more perimeter walls attached to a base, wherein the one or more perimeter walls and the base form a tray;
placing a first grass mat within the tray;
applying water to the first grass mat to prolong use of the first grass mat;
removing the first grass mat from the tray; and
placing a second grass mat within the tray.

15. The method of claim 14, wherein the first grass mat comprises two or more sections, and wherein the method further comprises:
rotating the two or more sections of the grass mat within the tray to prolong use of the grass mat based on the received sunlight of each section of the two or more sections of the grass mat.

16. The method of claim 14, further comprising:
removing the second grass mat from a green trash bag;
placing the removed first grass mat in the green trash bag; and
disposing of the green trash bag.

17. A device comprising:
a base;
one or more perimeter walls attached to the base, wherein the one or more perimeter walls and the base form a tray; and
one or more removable splash guard walls, wherein the one or more removable splash guard walls are connected to the one or more perimeter walls, wherein a liquid applied to a portion of the one or more removable splash guard walls is configured to flow down the one or more removable splash guard walls and the one or more perimeter walls and into the tray, and wherein the one or more removable splash guard walls are adjustable in height.

18. The device of claim 17, wherein the one or more perimeter walls comprise a curved section sloping down to the base, wherein the curved section provides for easier cleaning and directs urine on the one or more removable splash guard walls toward a middle of the tray and away from edges of the tray.

* * * * *